No. 705,298. Patented July 22, 1902.
B. F. RINKER.
HARVESTING MACHINE.
(Application filed Aug. 30, 1901.)
(No Model.) 2 Sheets—Sheet 1.

Witnesses
Wm J Jacobi
J. C. Cox

Inventor
B. F. Rinker.
By W. S. Fitzgerald
Attorneys

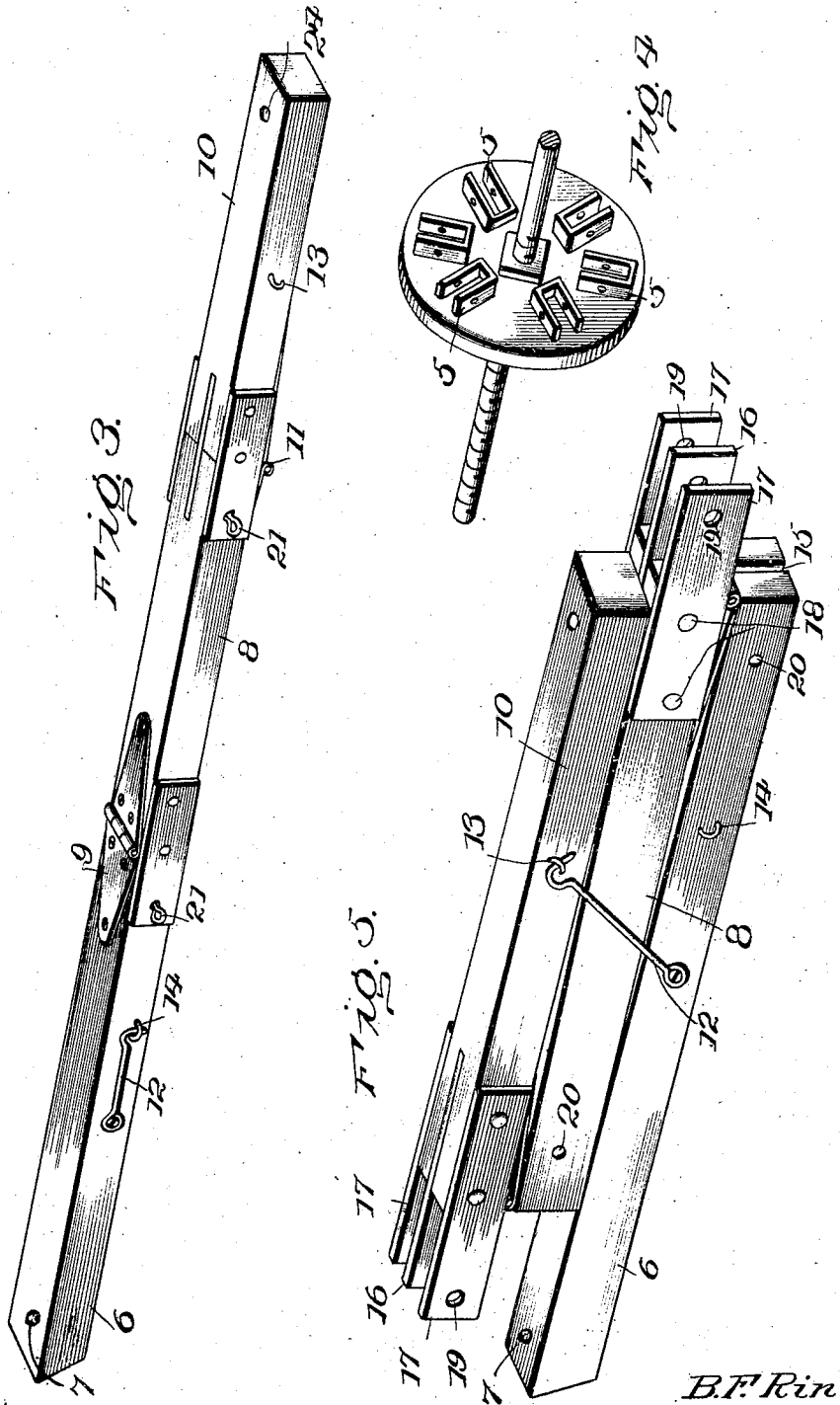

UNITED STATES PATENT OFFICE.

BENJAMIN FRANKLIN RINKER, OF MOORESVILLE, INDIANA.

HARVESTING-MACHINE.

SPECIFICATION forming part of Letters Patent No. 705,298, dated July 22, 1902.

Application filed August 30, 1901. Serial No. 73,868. (No model.)

*To all whom it may concern:*

Be it known that I, BENJAMIN FRANKLIN RINKER, a citizen of the United States, residing at Mooresville, in the county of Morgan and State of Indiana, have invented certain new and useful Improvements in Harvesting-Machines; and I do hereby declare the following to be a full, clear, and exact description of the invention, such as will enable others skilled in the art to which it appertains to make and use the same.

My invention relates to harvesting-machines, and more particularly to the construction of reels; and the object of my invention is to provide a reel which is so constructed that it will be collapsible or have the capacity of being folded within a compact and convenient form for shipment or to enable the reaper to be conveyed from one field to another without liability of injury to the reel, as is now common, such injury arising from the reel contacting with the limbs of trees, gate-posts, and door-frames, as will be readily understood.

Other objects and advantages will be made fully apparent from the following specification considered in connection with the accompanying drawings, in which—

Figure 1:
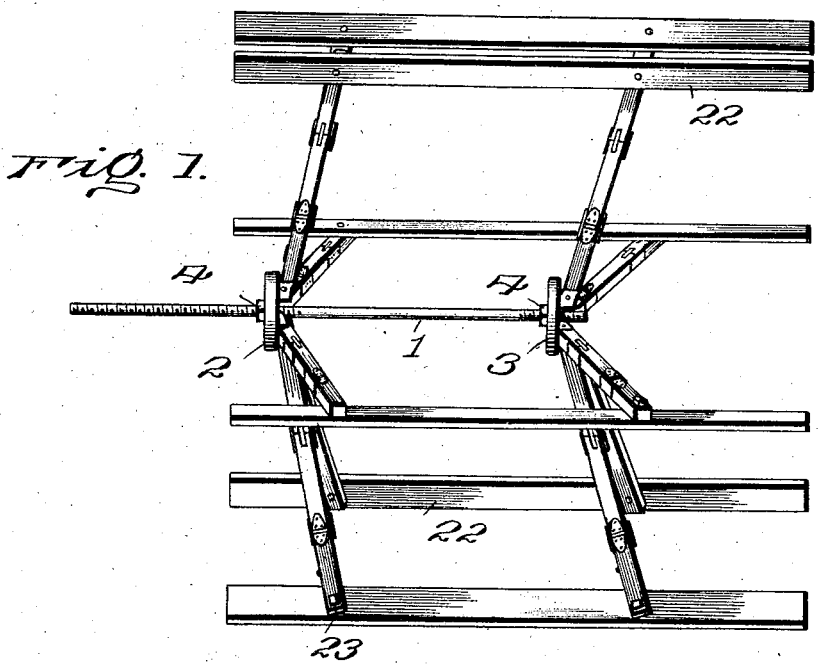
Figure 2:
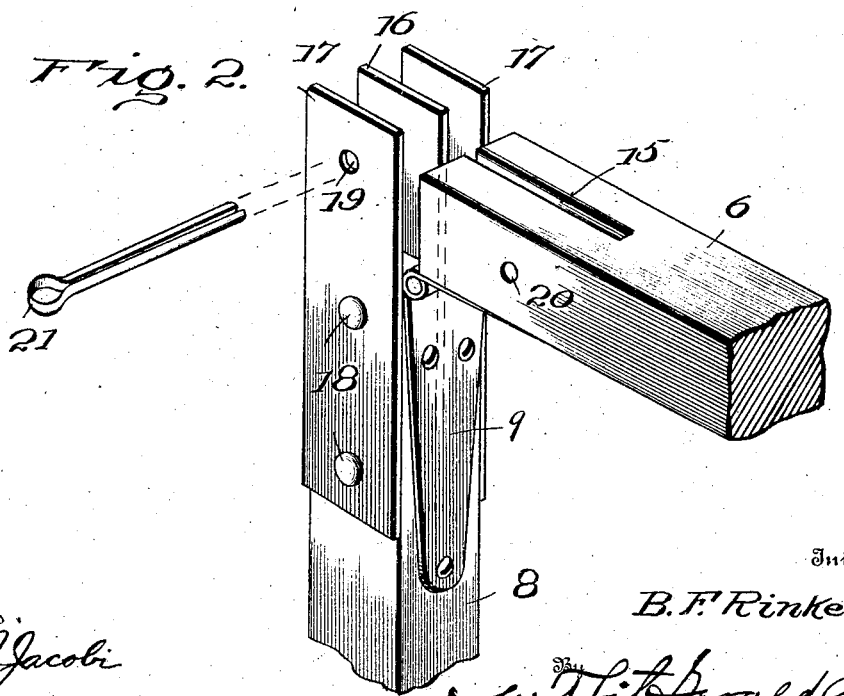

Figure 1 is a side elevation of my improved reel complete ready to be folded within a compact form. Fig. 2 is a perspective detail view, on an enlarged scale from that presented in Fig. 1, of a portion of one of the folding arms of my reel. Fig. 3 is a perspective detail view of one of the arms complete separated from the other parts and in an extended condition. Fig. 4 is a perspective detail view of a portion of the reel-shaft and one of the arm-securing members or disks carried by said shaft. Fig. 5 is a perspective detail view of the parts illustrated in Fig. 3 in a folded or collapsed condition.

For convenience of reference to the various parts of my invention and the coöperating accessories numerals will be employed, of which 1 indicates the reel-shaft, which is provided at each end with a threaded portion, as is usual, designed to receive the inner and outer disks 2 and 3, respectively, which disks are properly adjusted and secured in their operative positions by a suitable jam-nut 4 or other preferred means. The disks 2 and 3 are of substantially the same construction as illustrated in Fig. 4, each disk being provided with a plurality of pockets or recesses formed by the parallel ears 5, each ear having an aperture designed to receive a bolt or pin, and it is obvious that by disposing the end of the member 6 of the reel-arm between the ears 5, so that the aperture 7 will register with the apertures in said ears, an arm may be very readily secured to the disk by passing a bolt through said aperture.

The member 6 is pivotally secured at its outer end to the member 8 by means of the hinge 9, while in like manner the member 10 is pivotally connected to the outer end of the member 8 by the hinge 11, which latter is disposed upon the opposite side of the member 8 from that occupied by the hinge 9, thereby enabling the said members to be easily and readily folded, so as to lie parallel with each other, as indicated in Fig. 5, said parts being securely held in folded condition by means of the hook 12, pivotally connected to the member 6 or 10, as preferred, and extending into engagement with a staple in the other one of said members.

In the present instance I have shown the hook 12 to be carried by the member 6 and adapted to reach into engagement with the staple 13, secured to the member 10, when the parts are disposed in a folded condition. When, however, the parts are extended ready for use, the free end of the hook 12 is designed to rest in and be secured by the staple 14, also carried by the member 6, as clearly shown in Fig. 3.

In order that the members 6, 8, and 10 may be pivotally secured together and at the same time insure that the pivot-point will be reliably reinforced and strengthened, I provide the member 6 with the centrally-disposed slot 15, adapted to receive the free end of the tongue 16 in a centrally-disposed slot formed in the contiguous end of the member 8. I also provide the member 8 with the parallel plates 17, secured to the outer side of the member 8, as by the bolts or rivets 18, which extend entirely through the end of the member 8 and the ends thereof secured by a nut or by being upset, as preferred. The members 16 and 17 are of sufficient length to reach beyond the end of the member 8, and as they lie parallel with each other it is obvious that the tongue 16 will readily take into the slot 15, while the extended ends of the plates 17 will contact with the outer sides of the contiguous end of the member 6, while the apertures 19, formed in the members 16 and 17, will register with the aperture 20, provided in the end of the member 6, and it is obvious that by entering a bolt or a split key 21, as indicated in Fig. 2, in said aperture 20 said key or bolt will securely unite said parts together and hold the members 6 and 8 in a rigid extended condition. In a similar manner I connect the contiguous ends of the members 8 and 10, the plate 16 being designed to take into a slot provided in the central part of the contiguous end of the member 8, while the parallel members or binding-plates 17, provided with apertures 19, will enable said ends to be locked in operative relationship by means of the split key 21 or a removably-disposed bolt, as is obvious.

Any suitable or ordinary form of hinge 9 or 11 will be all that is required to insure that the parts will not become casually separated from each other, and it is obvious that after the member 6 has been connected, by means of its aperture 7, with its respective pair of ears 5 the wing or blade 22 may be connected to the outer end of the member 10 by means of a bolt 23, extending through an aperture in the wing and in engagement with the aperture 24 in the end of said member.

It is further obvious that the hinges 9 and 11 are properly disposed so that the arms, with their accompanying wings or blades, may be readily folded, so that the reel will occupy a minimum amount of space when it is desired to protect the reel, as when moving the machine from field to field or when the parts of the machine are boxed ready for shipment.

It will be understood that the various parts of my invention may be formed of any preferred material and of any desired size, and while I have described the preferred construction and combination of parts I wish to comprehend such substantial equivalents and substitutes as may be considered to fall fairly within the scope of my invention.

Having thus fully described the construction of my invention, it is thought that the operation or manner of using the same will be fully apparent, though it may be stated that when the parts are assembled in their respective operative positions the reel may be readily folded by removing the split keys 21 or the bolts, as the case may be, from the aperture 20, when the blade or wing 22 may be folded inward, the members or both hinges 9 and 11 being brought parallel with each other or into a folded position. It is obvious that the arms may be very quickly unfolded and the wings of the reels disposed in their operative positions by extending the hinges 9 and 11 and inserting the split key 21 in the aperture provided for its reception.

Having thus described the construction and manner of using my invention, further description will be dispensed with.

What I claim as new, and desire to secure by Letters Patent, is—

The herein-described folding reel, comprising the main shaft 1 threaded at its inner and outer ends, combined with a pair of disks, one for each threaded end of said threaded shaft and means to hold said disks in an adjusted position; suitable sockets formed upon each of said disks; folding arms comprising the members 6, 8 and 10; suitable hinges connecting said members and means, substantially as described, for reinforcing said hinges and enabling said members to be folded parallel with each other or extended, all combined substantially as specified and for the purpose set forth.

In testimony whereof I affix my signature in presence of two witnesses.

BENJAMIN FRANKLIN RINKER.

Witnesses:
PETER SLAUGHTER,
OTTO E. ROOKER.